United States Patent [19]

Chih

[11] Patent Number: 5,599,066
[45] Date of Patent: Feb. 4, 1997

[54] BACKREST ADJUSTING STRUCTURE OF A CHAIR

[76] Inventor: Chen C. Chih, P.O. Box 82-144, Taipei, Taiwan

[21] Appl. No.: 671,327

[22] Filed: Jun. 27, 1996

[51] Int. Cl.$^6$ ...................................................... B60N 2/02
[52] U.S. Cl. .................. 297/383; 297/440.24; 297/440.1
[58] Field of Search ..................................... 297/353, 383, 297/354.12, 362, 440.1, 440.23, 440.2, 440.24

[56] References Cited

U.S. PATENT DOCUMENTS

| | | | |
|---|---|---|---|
| 4,030,750 | 6/1977 | Abram ................................ | 297/383 X |
| 4,032,189 | 6/1977 | Benavente et al. .................. | 297/383 X |
| 4,466,660 | 8/1984 | Mabie ................................. | 297/383 X |
| 4,763,952 | 8/1988 | Gaudreau, Jr. ...................... | 297/383 |

*Primary Examiner*—Milton Nelson, Jr.
*Attorney, Agent, or Firm*—Alfred Lei

[57] ABSTRACT

A backrest adjusting structure including a backrest having a retractable shaft transversely disposed near a bottom side thereof and a stop adapted for stopping the retractable shaft from rotary motion, the retractable shaft having two fixed gears at two opposite ends; two guide tubes disposed in parallel and spaced from the backrest at two opposite sides, each of the guide tubes having a longitudinal series of locating holes; fasteners adapted for securing the guide tubes in place; and two sliding sleeves respectively and slidably mounted around the guide tubes, each of the sliding sleeves having an internally toothed socket raised from the periphery and engaged with one of the fixed gears, and a radial through hole adapted for connecting to one of the locating holes of the corresponding guide tube, a locating rod balanced on an upright lug and forced by a spring into engagement with the radial through hole and one of the locating holes of the corresponding guide tube, and a press button controlled to release the locating rod, for permitting the sliding sleeve to be moved along the respective guide tube to adjust the position of the backrest horizontally.

4 Claims, 7 Drawing Sheets

5,599,066

BACKREST ADJUSTING STRUCTURE OF A CHAIR

BACKGROUND OF THE INVENTION

1. Field of the Invention

This invention relates to a backrest adjusting structure which secures a backrest to a chair, permitting it to be adjusted horizontally.

2. Description of the Prior Art

Regular arm chairs commonly have a backrest adapted for supporting the user's back. However, because the position of the backrest cannot be adjusted horizontally, the user's back cannot be fully supported on the backrest when sits on the front part of the seat of the chair convenient for working on the desk.

SUMMARY OF THE INVENTION

This invention relates to a backrest adjusting structure which secures a backrest to a chair, permitting it to be adjusted horizontally.

This invention has been accomplished to provide a backrest adjusting structure which permits the backrest of the chair to be adjusted horizontally so that the user's back can be fully supported on the backrest while working. According to one aspect of the present invention, the backrest adjusting structure comprises a backrest having a retractable shaft transversely disposed near a bottom side thereof and stop means adapted for stopping the retractable shaft from rotary motion, the retractable shaft having two fixed gears at two opposite ends; two guide tubes disposed in parallel and spaced from the backrest at two opposite sides, each of the guide tubes having a longitudinal series of locating holes; fastening means adapted for securing the guide tubes in place; and two sliding sleeves respectively and slidably mounted around the guide tubes, each of the sliding sleeves having an internally toothed socket raised from the periphery and engaged with one of the fixed gears, and a radial through hole adapted for connecting to one of the locating holes of the corresponding guide tube, a locating rod balanced on an upright lug and forced by a spring into engagement with the radial through hole and one of the locating holes of the corresponding guide tube, and a press button controlled to release the locating rod, for permitting the sliding sleeve to be moved along the respective guide tube to adjust the position of the backrest horizontally. According to another aspect of the present invention, the fastening means comprises four mounting devices respectively fastened to the guide tubes at two opposite ends and adapted for securing the guide tubes to the armrests of the chair. The mounting devices are respectively and fixedly fastened to the guide tubes at two opposite ends by a respective screw, each having a substantially U-shaped swivel mounting shaft adapted for fixing to one armrest of the chair by a tightening up screw and a cushion on the tightening up screw.

BRIEF DESCRIPTION OF THE DRAWINGS

FIGS. 2, 2A and 2B shows the structure of the retractable shaft and the locating plate according to the present invention;

FIG. 2 is an exploded view of one guide tube and the corresponding sliding sleeve according to the present invention;

DETAILED DESCRIPTION OF THE PREFERRED EMBODIMENT

Figure 1:
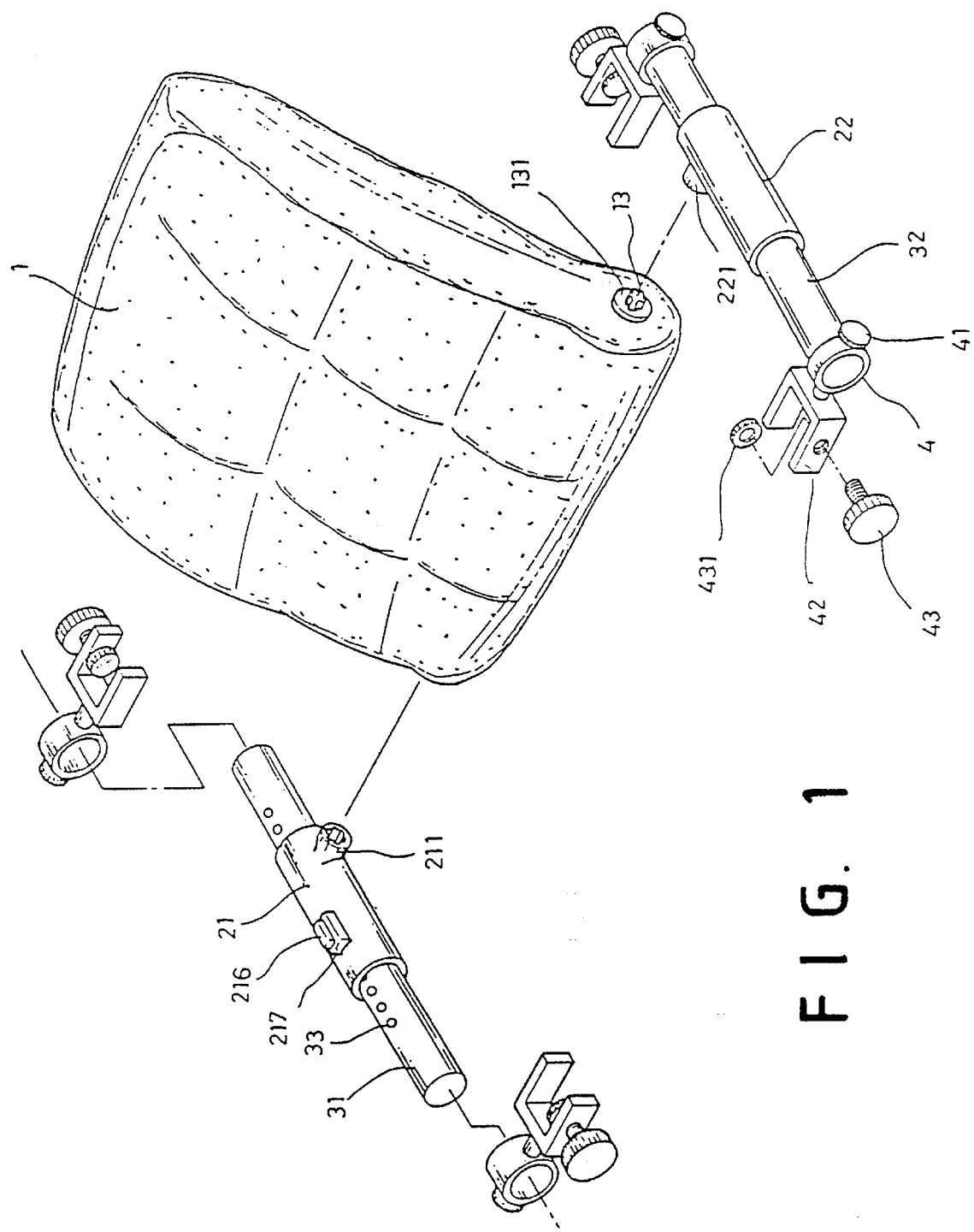
FIG. 1 is an exploded view of the backrest adjusting structure of the present invention.
Figure 2:
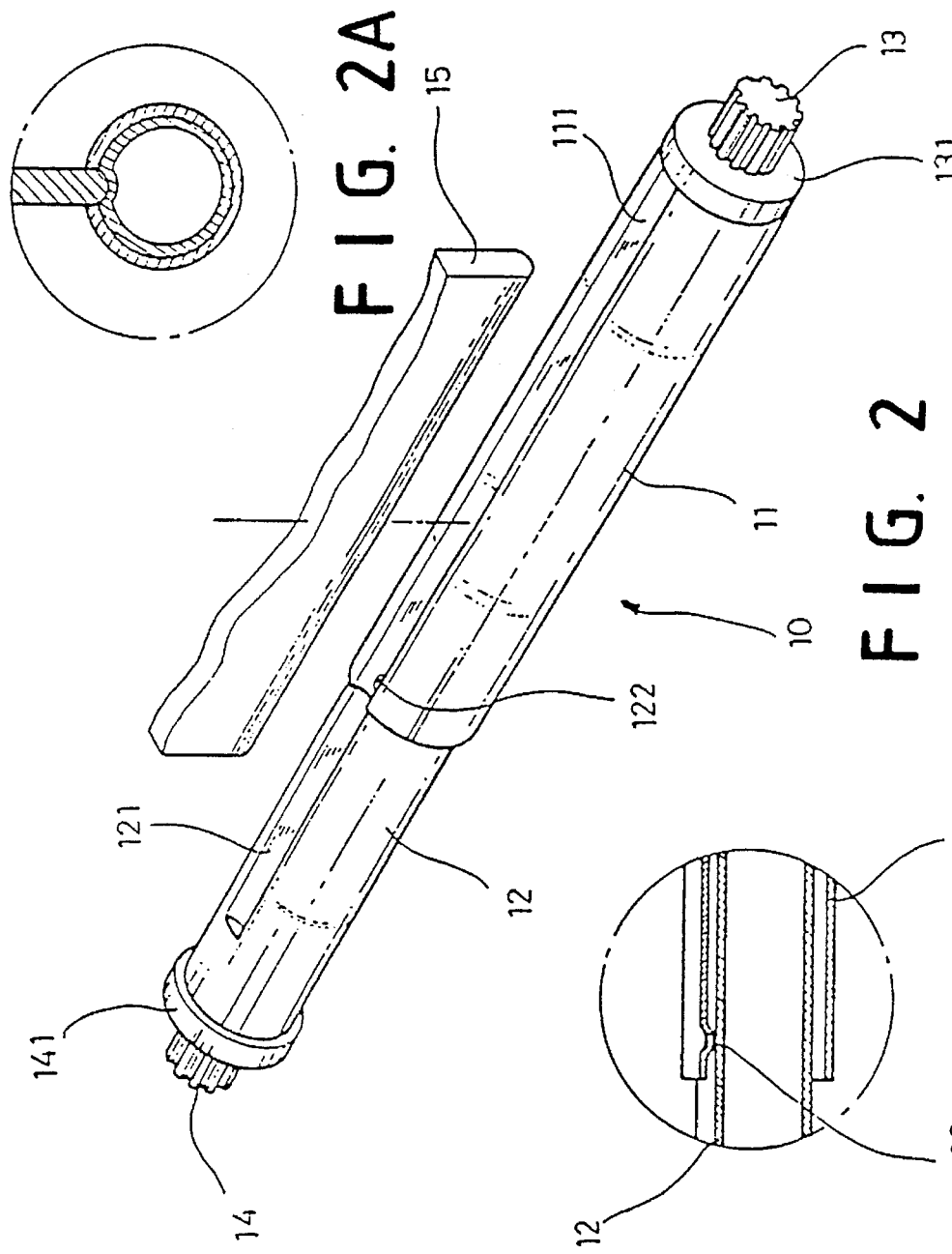

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 6:
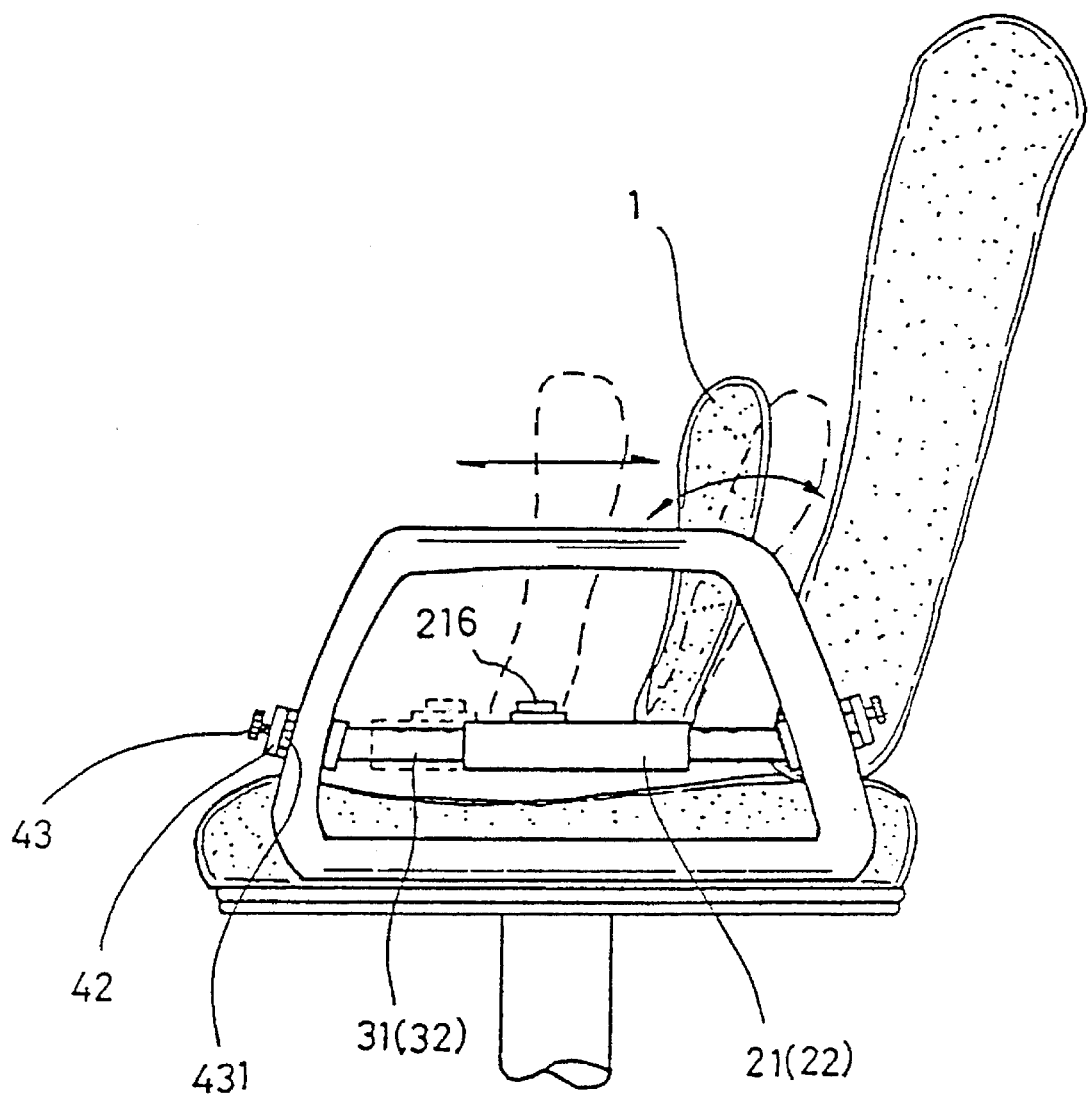
FIG. 6 is an applied view of the present invention, showing the backrest adjusting structure installed in an arm chair.

Referring to FIGS. 1, 2, 2A and 2B, a retractable shaft 10 is transversely mounted in the backrest 1 of a chair near the bottom. The retractable shaft 10 is comprised of a first tube 11 and a second tube 12. The second tube 12 has a longitudinal recess 121. The first tube 11 is sleeved onto the second tube 12, having a longitudinal recess 111 coupled to the longitudinal recess 121 of the second tube 12. The first tube 11 has a raised portion 122 raised from the inside wall and disposed in contact with the surface of the longitudinal recess 121 of the second tube 12 for positioning. A locating plate 15 is mounted inside the backrest 1 and forced into the longitudinal recess 111 of the first tube 11 to stop it from rotary motion. Because the longitudinal recess 111 of the first tube 11 is coupled to the longitudinal recess 121 of the second tube 12, the first tube 11 and the second tube 12 can only be moved relative to each other in the axial direction but are prohibited from rotary motion relative to each other. Two end caps, namely, the first end cap 131 and the second end cap 141 are respective and fixedly fastened to the two opposite ends of the retractable shaft 10 outside the backrest 1. A first fixed gear 13 and a second fixed gear 14 are respectively mounted on the end caps 131, 141 on the outside. A first guide tube 32 and a second guide tube 31 are respectively fastened to for example the armrests of the chair (see FIG. 6) at two opposite lateral sides of the backrest 1 by mounting devices 4. Two sliding sleeves 21, 22 are respectively slidably mounted around the guide tubes 31, 33. Each of the sliding sleeves 21, 22 has an internally toothed socket 211, 221 raised from the periphery and respectively meshed with the fixed gears 14, 13.

Referring to FIG. 1 again, each of the mounting devices 4 is fixedly fastened to one end of the guide tube 31 or 32 by a tightening up screw 41, having a substantially U-shaped swivel mounting shaft 42 adapted for fixing to one armrest of the chair by a tightening up screw 43, which is mounted with a cushion 431.

Figure 3:
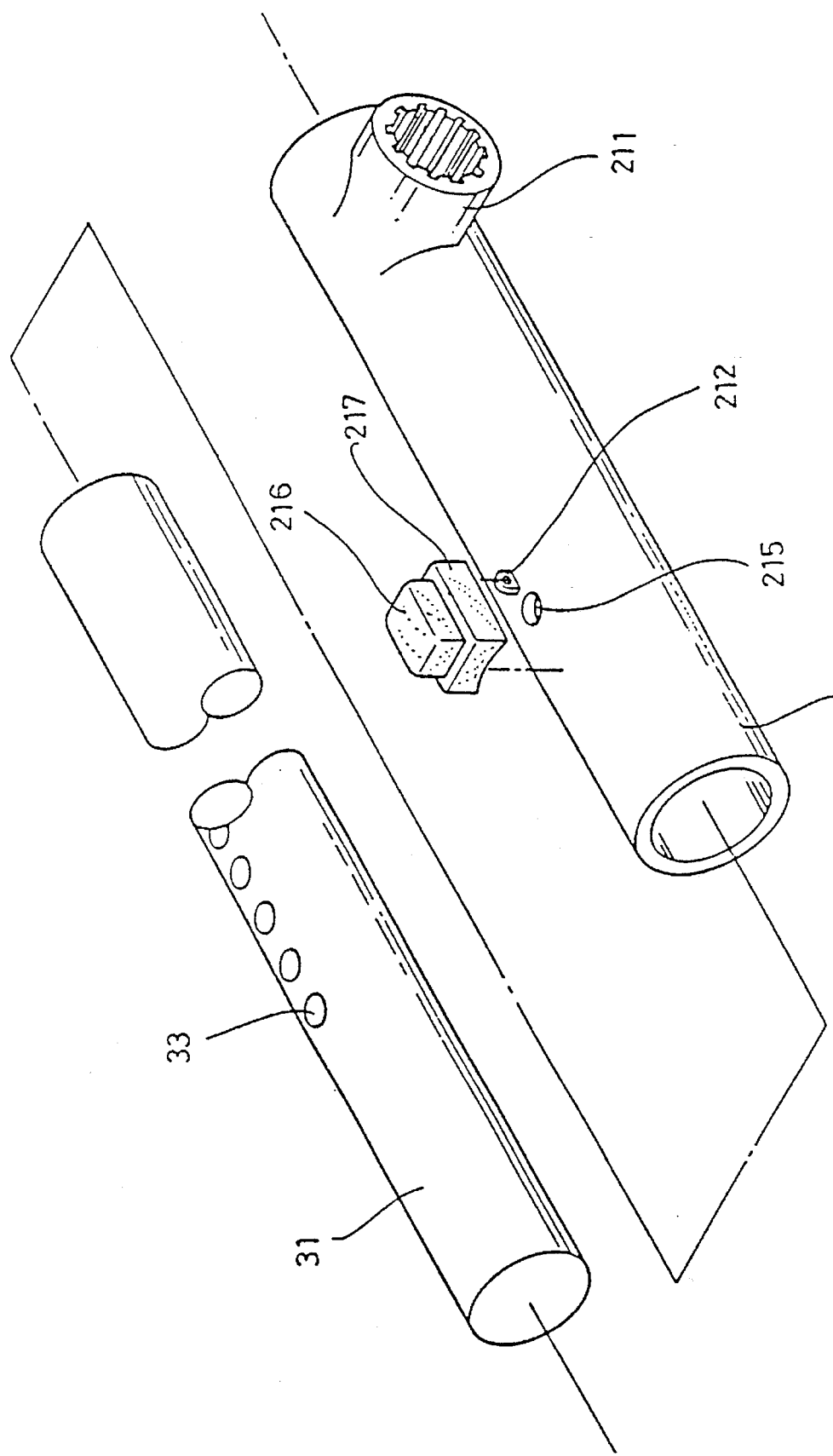
Figure 4:
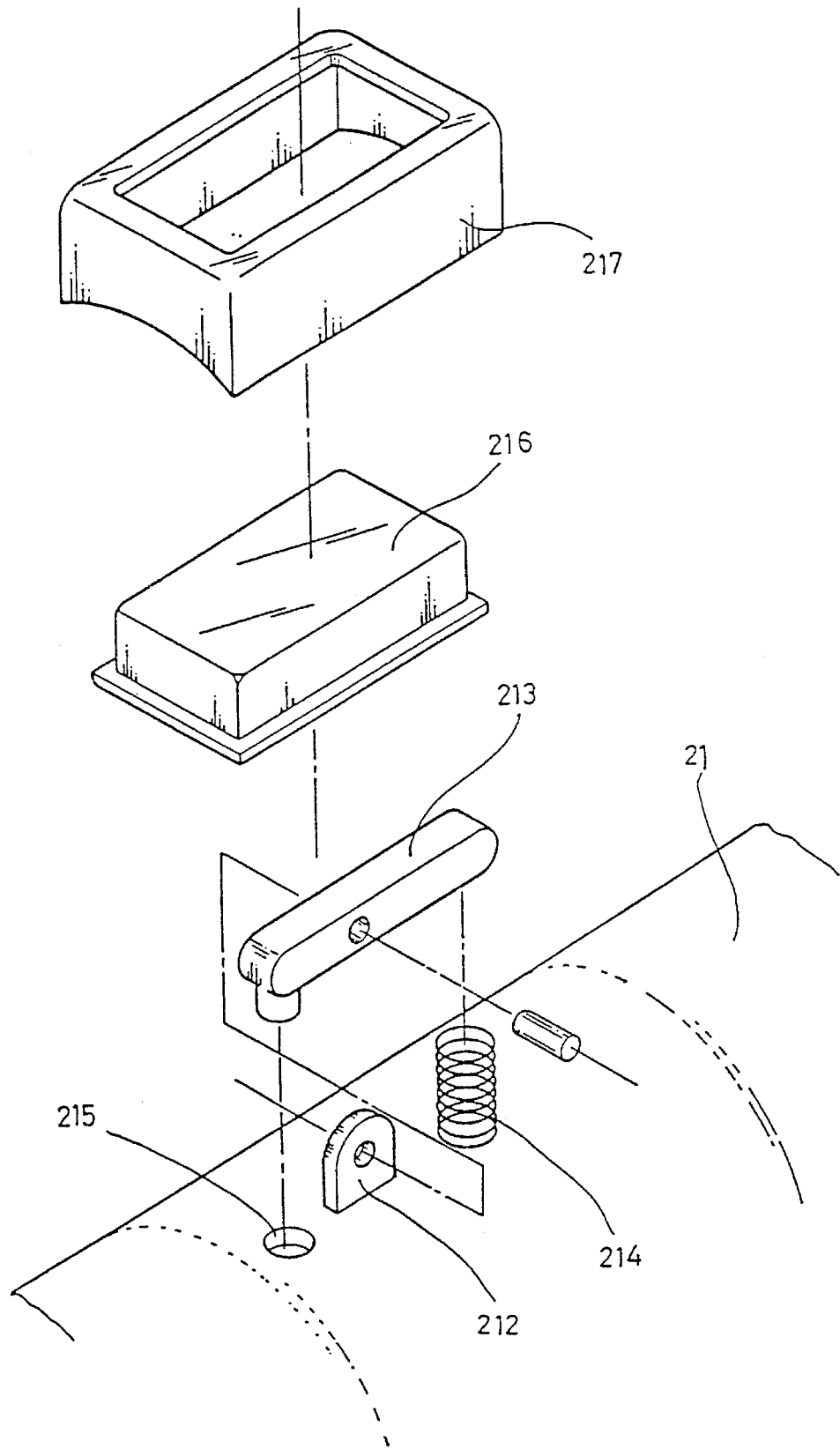
FIG. 4 is an exploded view in an enlarged scale of a part of the sliding sleeve shown in FIG. 3.
Figure 5:
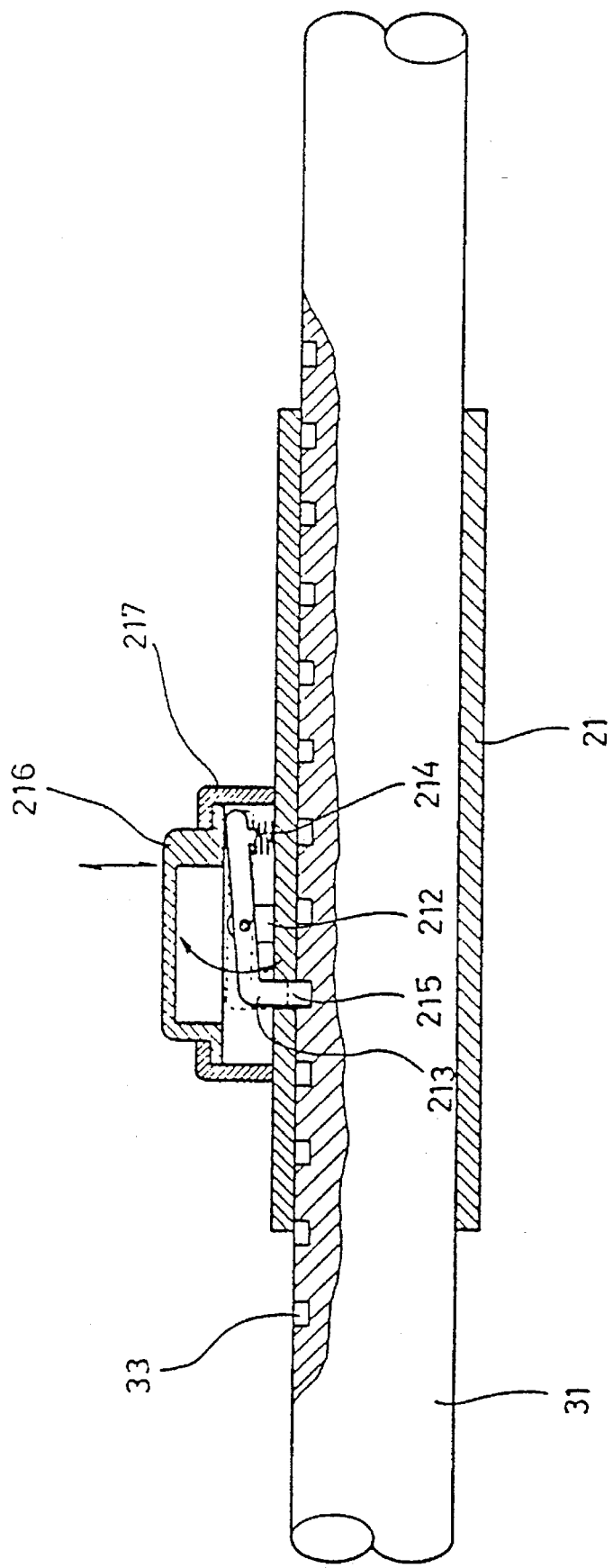
FIG. 5 is a sectional assembly view of FIG. 4.

Referring to FIGS. 3, 4, and 5, and FIG. 6 again, the guide tube 31 has a longitudinal series of locating holes 33. The sliding sleeve 21 has a radial through hole 215, and an upright lug 212 raised from the periphery adjacent to the through hole 215. A substantially L-shaped locating rod 213 is balanced on the upright lug 212, and forced by a spring 214 into engagement with the through hole 215 and one locating hole 33 of the guide tube 31 to hold the guide tube 31 and the sliding sleeve 21 firmly together. A frame 217 is fixedly mounted on the sliding sleeve 21 around the through hole 215, the upright lug 212, the spring 214, and the locating rod 213 to hold a press button 216. When the press button 216 is depressed, the locating rod 213 is moved from the inclined position to the balanced position on the upright lug 212 and released from the locating holes 33 of the guide tube 31 and the radial through hole 215 of the sliding sleeve 21, permitting the sliding sleeve 21 to be moved along the guide tube 31 so that the backrest 1 is moved horizontally forwards or backwards to the desired position. When the position of the backrest 1 is adjusted, the press button 216 is released, permitting the locating rod 213 to be forced by the spring 214 into engagement with the radial through hole 215 of the sliding sleeve 21 and the designated locating hole 33 of the guide tube 31 to hold the sliding sleeve 22 in the adjusted position. The sliding sleeve 22 and the guide tube 32 have the same positioning structure, therefore it is not necessary to describe the structure of the sliding sleeve 22 and the structure of the guide tube 32 in detail.

Referring to FIGS. 2 and 6 again, when the guide tubes 31, 32 are respectively fastened to the armrests of the chair, the first tube 11 and the second tube 12 are axially moved relative to each other to adjust the total length of the retractable shaft 10 subject to the distance between the first guide tube 32 and the second guide tube 31, so that the fixed gears 13, 14 can be respectively forced into engagement with the internally toothed sockets 221, 211.

Figure 7:
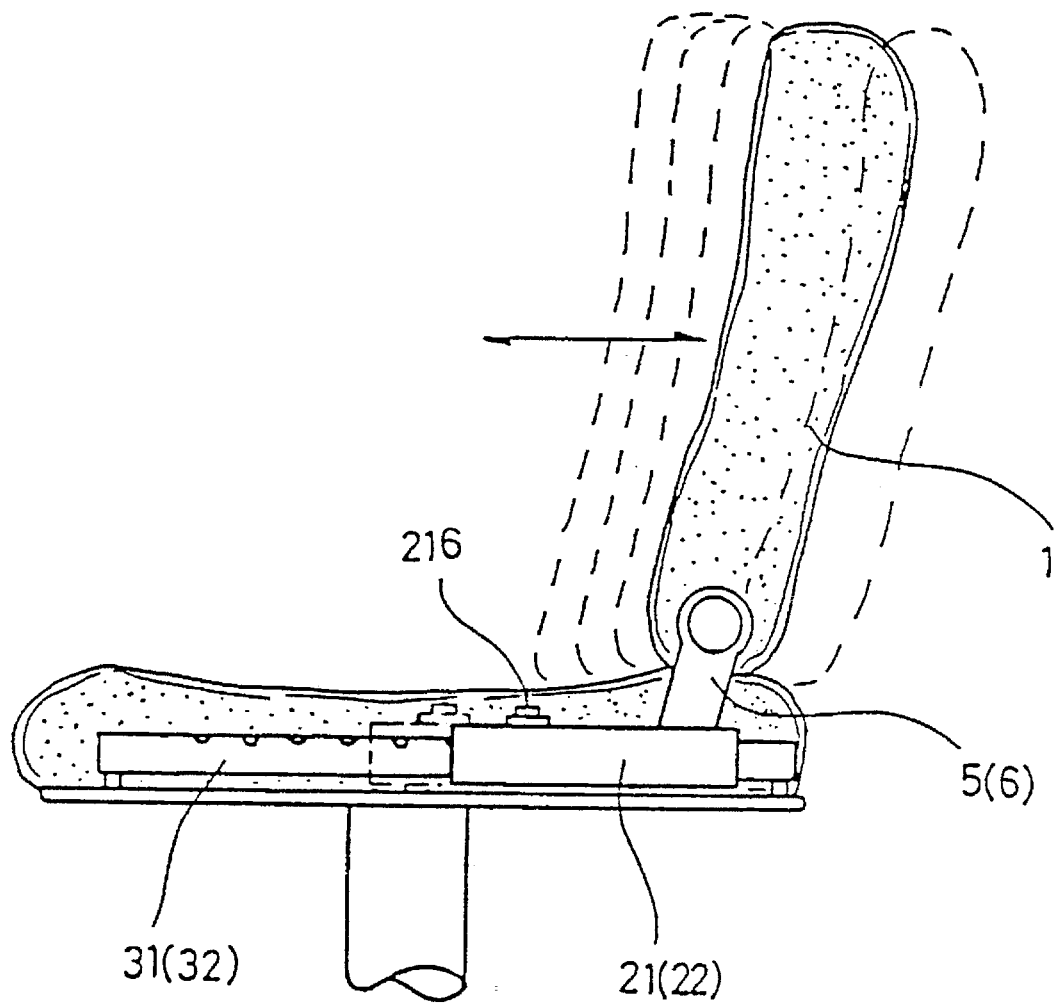
FIG. 7 is another applied view of the present invention, showing the backrest adjusting structure installed in an armless chair.

FIG. 7 shows an alternate form of the present invention, in which the guide tubes 31, 32 are respectively fixed to the seat of the chair at two opposite sides, and two links 5,6 bilaterally coupled between the backrest 1 and the sliding sleeves 21, 22. This arrangement permits the backrest 1 to be horizontally adjusted along the guide tubes 31, 32.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A backrest adjusting structure comprising:

a backrest having a retractable shaft transversely disposed near a bottom side thereof and stop means adapted for stopping said retractable shaft from rotary motion, said retractable shaft comprising a first tube, a second tube slidably inserted into said first tube, a first end cap fixedly secured to said first tube at one end remote from said second tube, a second end cap fixedly secured to said second tube at one end remote from said first tube, a first fixed gear fixedly mounted on said first end cap outside said backrest, and a second fixed gear fixedly mounted on said second end cap outside said backrest;

two guide tubes disposed in parallel and spaced from said backrest at two opposite sides, each of said guide tubes having a longitudinal series of locating holes;

fastening means adapted for securing said guide tubes in place; and two sliding sleeves respectively and slidably mounted around said guide tubes, each of said sliding sleeves having an internally toothed socket raised from its periphery and engaged with one of said first fixed gear and said second fixed gear, a radial through hole adapted for connecting to one of the locating holes of the corresponding guide tube, an upright lug raised from the periphery adjacent to said radial through hole, a spring, a locating rod pivoted to said upright lug and forced by said spring into engagement with said radial through hole and one of the locating holes of the corresponding guide tube, and a press button mounted on the corresponding sliding sleeve by a frame and supported above said locating rod, said press button being adapted for pressing said locating rod to compress said spring and to release said locating rod from said radial through hole and the locating holes of the corresponding guide tube, for permitting the respective sliding sleeve to be moved along the respective guide tube.

2. The backrest adjusting structure as claimed in claim 1 wherein said fastening means comprises four mounting devices respectively fastened to said guide tubes at two opposite ends and adapted for securing said guide tubes to armrests of a chair to be used with said backrest, each of said mounting devices being fixedly fastened to one end of one guide tube by a screw, having a substantially U-shaped swivel mounting shaft adapted for fixing to one armrest of the chair by a tightening up screw and a cushion on the tightening up screw.

3. The backrest adjusting structure as claimed in claim 1 wherein said backrest has a smoothly curved front side fitting a user's back.

4. A backrest adjusting structure comprising:

a backrest having a retractable shaft transversely disposed near a bottom side thereof and stop means adapted for stopping said retractable shaft from rotary motion;

two guide tubes disposed in parallel and spaced from said backrest at two opposite sides, each of said guide tubes having a longitudinal series of locating holes;

two links bilaterally connected between said retractable shaft and said guide tubes;

fastening means adapted for securing said guide tubes in place; and two sliding sleeves respectively and slidably mounted around said guide tubes, each of said sliding sleeves having an internally toothed socket raised from its periphery and engaged with one of a first fixed gear and a second fixed gear, a radial through hole adapted for connecting to one of the locating holes of the corresponding guide tube, an upright lug raised from the periphery adjacent to said radial through hole, a spring, a locating rod pivoted to said upright lug and forced by said spring into engagement with said radial through hole and one of the locating holes of the corresponding guide tube, and a press button mounted on the corresponding sliding sleeve by a frame and supported above said locating rod, said press button being adapted for pressing said locating rod to compress said spring and to release said locating rod from said radial through hole and the locating holes of the corresponding guide tube, for permitting the respective sliding sleeve to be moved along the respective guide tube.

* * * * *